(12) United States Patent
Yang et al.

(10) Patent No.: US 11,445,468 B2
(45) Date of Patent: Sep. 13, 2022

(54) ELECTRONIC DEVICE AND METHOD FOR POSITION DETERMINATION USING UWB SIGNAL

(71) Applicant: Samsung Electronics Co., Ltd., Gyeonggi-do (KR)

(72) Inventors: Yi Yang, Gyeonggi-do (KR); Moonseok Kang, Gyeonggi-do (KR); Hyunchul Kim, Gyeonggi-do (KR); Jonghoon Jang, Gyeonggi-do (KR); Sehwan Choi, Gyeonggi-do (KR); Sukgi Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/932,976

(22) Filed: Jul. 20, 2020

(65) Prior Publication Data
US 2021/0076350 A1 Mar. 11, 2021

(30) Foreign Application Priority Data
Sep. 9, 2019 (KR) .................. 10-2019-0111814

(51) Int. Cl.
*H04W 64/00* (2009.01)
*H04W 4/029* (2018.01)
(Continued)

(52) U.S. Cl.
CPC ............ *H04W 64/006* (2013.01); *G01S 3/50* (2013.01); *H04B 17/318* (2015.01); *H04L 43/08* (2013.01); *H04W 4/029* (2018.02)

(58) Field of Classification Search
CPC .. H04W 64/006; H04W 4/029; H04B 17/318; G01S 3/50; H04L 43/08
(Continued)

(56) References Cited

U.S. PATENT DOCUMENTS

RE44,047 E    3/2013  Paljug et al.
8,681,048 B2  3/2014  Nishida
(Continued)

FOREIGN PATENT DOCUMENTS

KR    10-2017-0071207 A    6/2017

OTHER PUBLICATIONS

International Search Report dated Oct. 22, 2020.

*Primary Examiner* — Chuck Huynh
(74) *Attorney, Agent, or Firm* — Cha & Reiter, LLC

(57) ABSTRACT

Provided is an electronic device that may include: an ultra wide band (UWB) communication module; a plurality of antennas; and a processor operatively connected to the UWB communication module. The UWB communication module may be configured to: receive first data of an UWB data frame from an external electronic device by using a first antenna set including at least two antennas among the plurality of antennas to measure a first angle of arrival (AOA); receive second data of the UWB data frame by using a second antenna set including at least two antennas among the plurality of antennas to measure a second AOA, where the second antenna set is configured during a section of the UWB data frame that does not include data; and measure the direction of the external electronic device by using the first AOA and the second AOA. It is possible to provide various other embodiments.

10 Claims, 16 Drawing Sheets

(51) Int. Cl.
  *G01S 3/50* (2006.01)
  *H04B 17/318* (2015.01)
  *H04L 43/08* (2022.01)

(58) Field of Classification Search
  USPC .................................................... 455/456.1
  See application file for complete search history.

(56) References Cited

U.S. PATENT DOCUMENTS

| | | |
|---|---|---|
| 2015/0234033 A1 | 8/2015 | Jamieson et al. |
| 2016/0216362 A1* | 7/2016 | Subramanian .......... H04W 4/02 |
| 2017/0199269 A1 | 7/2017 | Allen et al. |
| 2018/0254870 A1 | 9/2018 | Dutz et al. |
| 2019/0170847 A1* | 6/2019 | Jamin ..................... G01S 3/043 |
| 2019/0195981 A1 | 6/2019 | Ding et al. |

* cited by examiner (a)

(b)

(c)

ELECTRONIC DEVICE AND METHOD FOR POSITION DETERMINATION USING UWB SIGNAL

CROSS-REFERENCE TO RELATED APPLICATION

This application is based on and claims priority under 35 U.S.C. § 119 to Korean Patent Application No. 10-2019-0111814, filed on Sep. 9, 2019, in the Korean Intellectual Property Office, the disclosure of which is incorporated by reference herein in its entirety.

BACKGROUND

Field

One or more embodiments of the instant disclosure generally relate to an electronic device that may determine position using a UWB signal and a method thereof.

Description of Related Art

Positioning or location technologies have recently advanced.

One early positioning technique uses the global positioning system (GPS), which receives signals from GPS satellites and calculates the current location of the user. The GPS signal is not well received indoors because it is highly attenuated when passing through objects such as buildings, making it unsuitable for indoor positioning.

Indoor positioning technologies developed so far may be described in brief as follows. With infrared-based positioning technology, infrared sensors are installed on the ceiling of the building, infrared generators in the form of badges called active badges are attached to persons, and corresponding signals are sensed by the infrared sensors to identify the position. With ultrasonic-based positioning technology, an ultrasonic wave generated from an ultrasonic generator attached to a person or an object is received by an ultrasonic receiver attached to the ceiling of the building to identify the position. With Wi-Fi-based positioning technology, the position is measured by using the strength or transmission delay of a radio frequency (RF) signal emitted by the access point (AP) of a wireless LAN. With radio frequency identification (RFID) based positioning technique, the reception strength of a received RF signal is measured, and the location is identified by measuring the signal transmission distance based on signal attenuation. With ultra wide band (UWB) based positioning technology, the position of a target is located using a wide frequency band signal.

The above information is presented as background information only to assist with an understanding of the disclosure. No determination has been made, and no assertion is made, as to whether any of the above might be applicable as prior art with regard to the disclosure.

SUMMARY

An electronic device may require an antenna to identify its location and/or the location of an external electronic device. The accuracy of the position measurement may vary depending on the number of antennas disposed in the electronic device. When the position is measured using a small number of antennas, the accuracy of the position measurement may be lower than when the position is measured using a large number of antennas.

As technology advances, the physical volume of electronic devices has gradually decreased, such that the number of antennas that can be included in an electronic device may be limited. In addition, as the number of antennas included in an electronic device increases, power consumed by the electronic device may increase, which may cause a problem.

Accordingly, it is necessary to develop a technique that can accurately determine the device's position using only a small number of antennas.

According to an embodiment of the disclosure, there is provided an electronic device. The electronic device may include: an ultra wide band (UWB) communication module; a plurality of antennas; and a processor operatively connected to the UWB communication module, wherein the UWB communication module may be configured to: receive first data of an UWB data frame from an external electronic device by using a first antenna set including at least two antennas among the plurality of antennas to measure a first angle of arrival (AOA); receive second data of the UWB data frame by using a second antenna set including at least two antennas among the plurality of antennas to measure a second AOA, where the second antenna set is configured during a section of the UWB data frame that does not include data; and measure a direction of the external electronic device by using the first AOA and the second AOA.

According to an embodiment of the disclosure, there is provided an operation method for an electronic device. The operation method may include: receiving first data of an UWB data frame from an external electronic device by using a first antenna set including at least two antennas among plurality of antennas to measure a first angle of arrival (AOA); receiving second data of the UWB data frame by using a second antenna set including at least two antennas among the plurality of antennas to measure a second AOA, where the second antenna set is configured during a section of the UWB data frame that does not include data; and measuring a direction of the external electronic device by using the first AOA and the second AOA.

Additional aspects will be set forth in part in the description which follows and, in part, will be apparent from the description, or may be learned by practice of the presented embodiments.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various embodiments of the disclosure will be described in detail with reference to accompanying drawings.

In one or more embodiments of the disclosure, in the case of measuring distance and direction to an external electronic device based on a signal received from the external electronic device, accuracy can be improved through switching between the antennas that receive the signals for location determination.

In one or more embodiments of the disclosure, based on one data frame received from an external electronic device, it is possible to rapidly identify the distance and direction to the external electronic device from which the data frame was transmitted.

Figure 1:
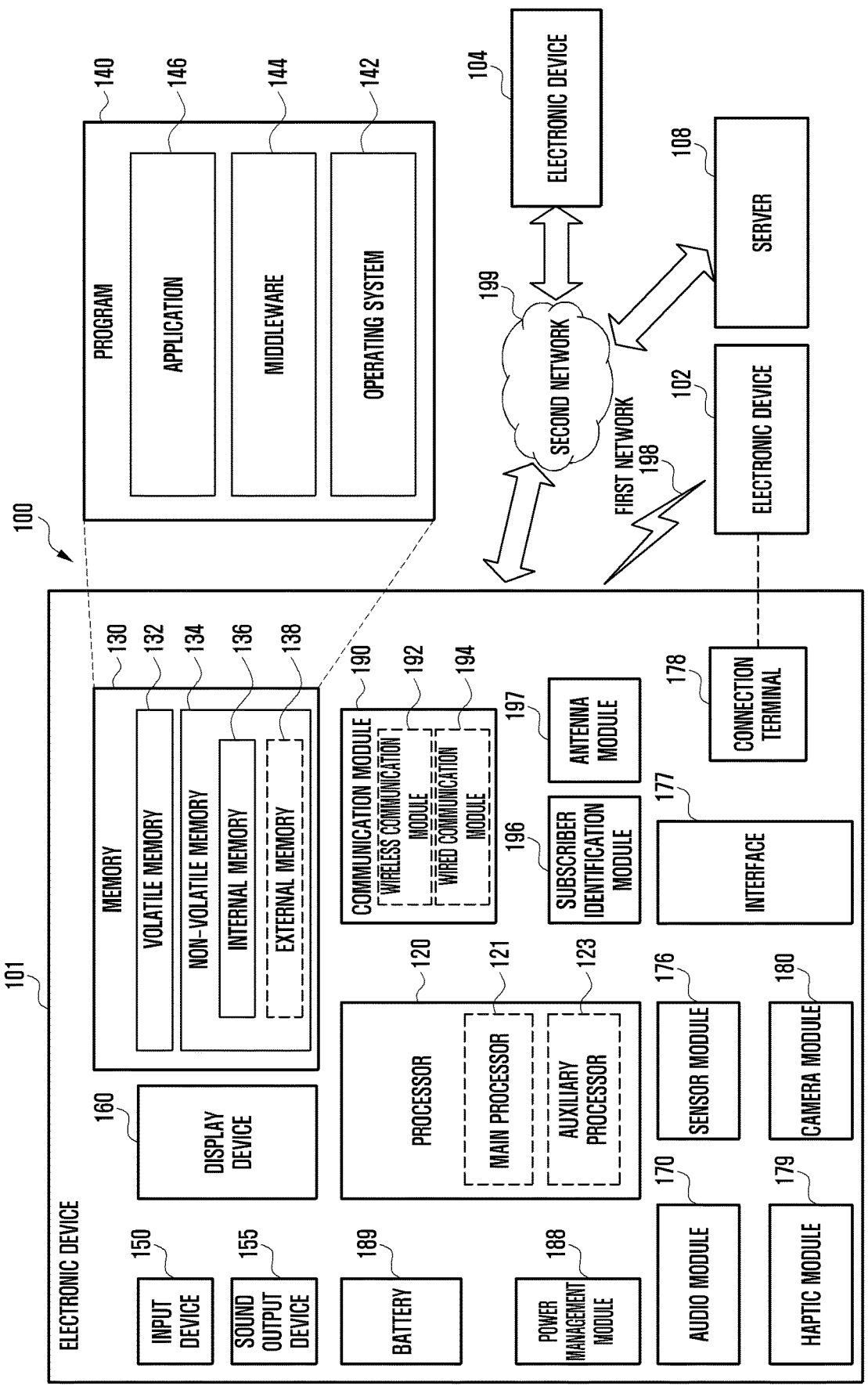
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

There are two main schemes for a receiving device to measure the distance to a transmitting device. The first scheme is one-way ranging. When the transmitting device transmits a signal carrying time information to the receiving device, the receiving device can identify the distance from the transmitting device by measuring the time of arrival. The second scheme is two-way ranging. The transmitting device and the receiving device may exchange signals several times and may measure the distance therebetween while sharing their time information to eliminate time errors. In one-way ranging, as communication is performed only once, the time required for distance measurement may be small and power consumption may be small, but synchronization must be achieved between the devices. On the other hand, in two-way ranging, power consumption may be large and the time required for position measurement may be long in comparison to one-way ranging. However, synchronization between the devices may be not necessary.

Two-way ranging schemes may be divided into one-sided two-way ranging and two-sided two-way ranging. In one-sided two-way ranging, when the transmitting device transmits one data frame, the receiving device transmits a data frame including information on the time the data frame is received and the time the data frame is transmitted. The transmitting device can measure the distance between the transmitting device and the receiving device by using the information included in the received data frame. In two-sided two-way ranging, when the transmitting device transmits one data frame, the receiving device transmits a data frame including information on the time the data frame is received and the time the data frame is transmitted. Then, the transmitting device transmits another data frame including information on the time the data frame is received and the time the data frame is transmitted. Thereby, both the transmitting device and the receiving device can measure the distance. The electronic device according to the instant disclosure can also measure the distance by using two-way ranging. This is described in detail below.

To identify the location of the transmitting device based on the location of the receiving device, the receiving device needs to know the direction of the transmitting device in addition to the distance. The receiving device can find the direction of the transmitting device by measuring the angle of arrival (AOA). For example, the receiving device may measure the AOA of a signal transmitted by the transmitting device, find the direction of the signal coming to the receiving device relative to the transmitting device, and determine the relative positions of the transmitting device and the receiving device.

When an electronic device (e.g., electronic device 101 in FIG. 1 serving as a receiving device) tries to determine its location or the location of the transmitting device by using UWB communication, the number of UWB antennas mounted on the electronic device may be important. While the electronic device 101 can measure only the distance to a target (e.g., transmitting device) by using at least one of the schemes described above if there is one UWB antenna, the electronic device 101 can measure the AOA in addition to the distance to the target if there are two UWB antennas.

Figure 2:
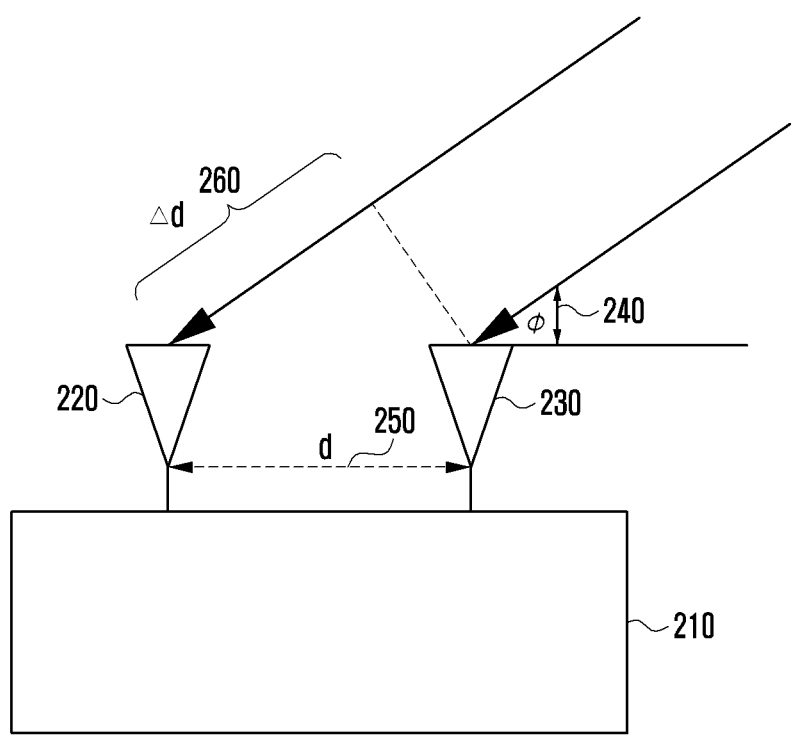
FIG. 2 depicts a theoretical scheme for the electronic device to measure the angle of arrival (AOA) using two UWB antennas.

FIG. 2 depicts a theoretical scheme for the electronic device to measure the AOA using two UWB antennas.

The electronic device 210 (e.g., electronic device 101 in FIG. 1) may include two UWB antennas 220 and 230 (e.g., antenna 197 in FIG. 1). The electronic device 210 may know the distance d (250) between the two UWB antennas 220 and 230. The distance difference Δd (260) between the two UWB antennas 220 and 230 can be calculated using Equation 1. Here, θ may indicate the AOA to be found.

$$\Delta d = d \cdot \cos\theta \quad\text{[Equation 1]}$$

In addition, the phase difference Δφ between the UWB signals reaching the two UWB antennas 220 and 230 can be represented by Equation 2.

$$\Delta\varphi = \frac{2\pi}{\lambda} \cdot \Delta d \quad\text{[Equation 2]}$$

Here, λ may indicate the wavelength of the UWB signal. The electronic device 210 may calculate the AOA by using Equation 3 derived from Equation 1 and Equation 2.

$$\theta = \cos^{-1}\frac{\Delta\varphi}{2\pi d/\lambda} \quad\text{[Equation 3]}$$

Hence, the electronic device 210 can find the AOA 240 by using the distance d (250) between the two UWB antennas 220 and 230 and the phase difference Δφ between the UWB signals reaching the UWB antennas 220 and 230 from the transmitting device. The AOA 240 may have a value between −90 degrees and 90 degrees in theory.

Figure 3:
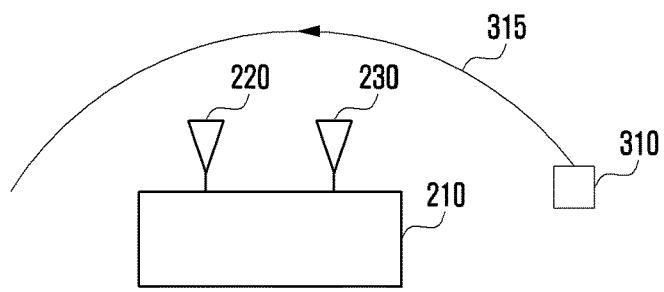
FIG. 3 shows a result of AOA measurement performed by the electronic device using two UWB antennas.
Figure 3:
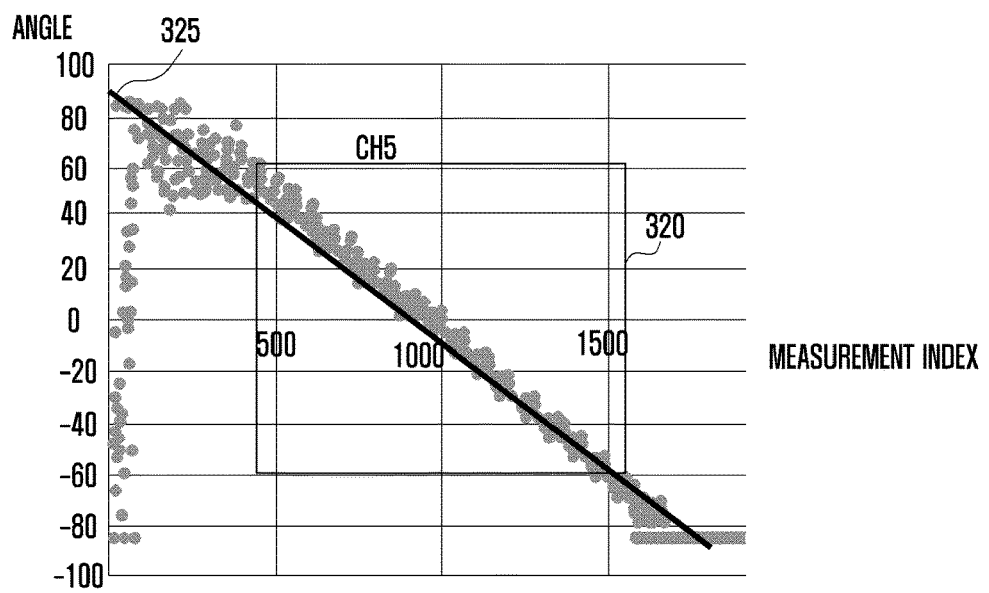
Figure 3:
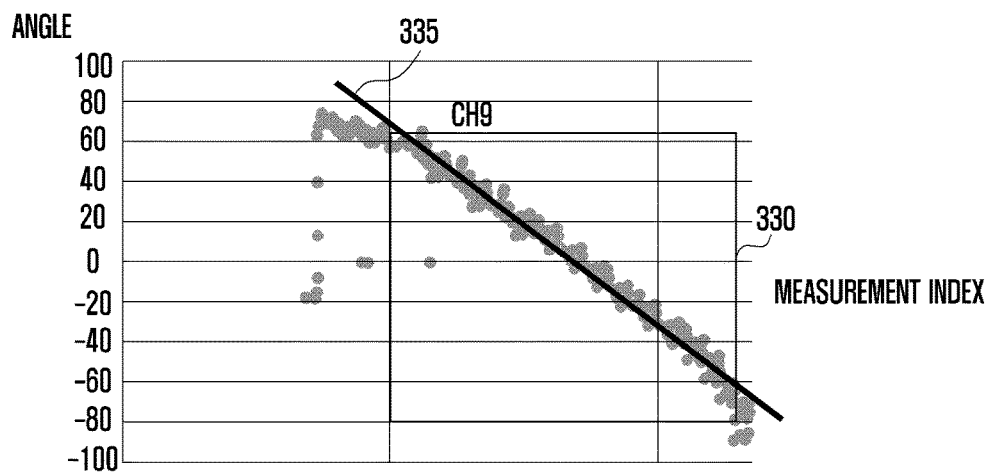

FIG. 3 shows a result of AOA measurement performed by the electronic device using two UWB antennas.

In part (a) of FIG. 3, the movement path of the transmitting device 310 is indicated by indicator 315. As indicated by the movement path 315, the transmitting device 310 may move with an AOA of between −90 degrees and 90 degrees relative to the electronic device 210. The transmission device 310 may transmit a UWB signal to the electronic device 210 while moving at a preset speed along the movement path 315.

Parts (b) and (c) of FIG. 3 show the results of measurement of the AOA to the transmitting device 310 performed by the electronic device 210 using two channels (e.g., channels 5 and 9) having different UWB signal frequency bands. In parts (b) and (c) of FIG. 3, the graphs 325 and 335 show the actual AOA between the transmitting device 310 and the electronic device 210. With reference to parts (b) and (c) of FIG. 3, when the AOA is between −60 and 60 degrees (total 120 degrees), as indicated by indicia 320 and 330, the graphs 325 and 335 match well, indicating that the measured AOA coincides with the actual AOA. However, in the other ranges, it can be seen that the gap between the AOA measured by the electronic device 210 and the graph 325 or 335 is wide and an error has occurred. It can also be seen that the measured AOA is not constant.

In certain embodiments of the disclosure, to reduce the error between the measured AOA and the actual AOA, the electronic device 210 may include a larger number of UWB antennas, and the UWB antennas may be properly arranged to accurately measure the AOA. In addition, the electronic device 210 may measure the AOA in three dimensions by using the plurality of UWB antennas.

Figure 4:
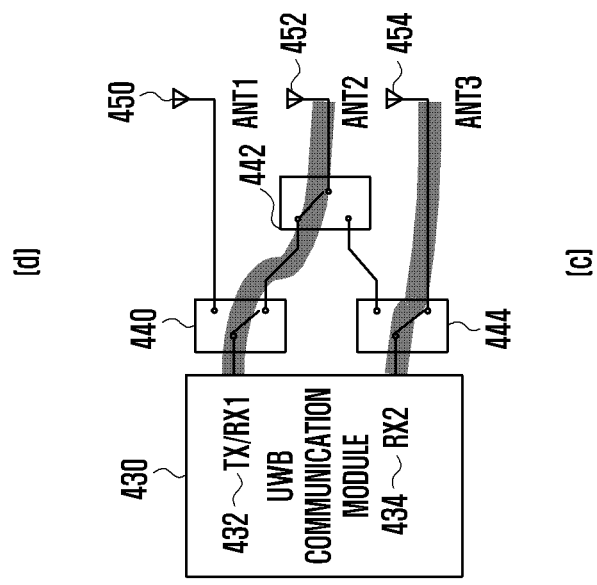
FIG. 4 illustrates a situation where the electronic device measures the AOA and distance according to an embodiment of the disclosure.
Figure 4:
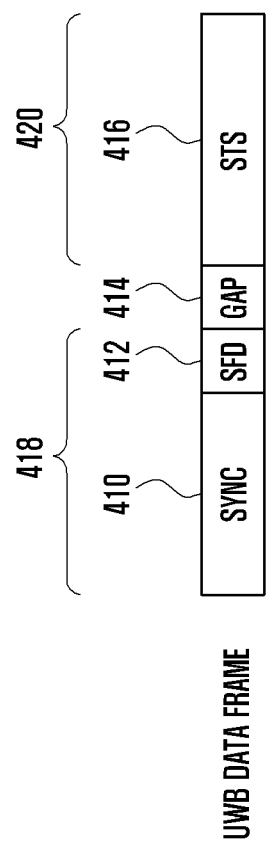

FIG. 4 illustrates a situation where the electronic device measures the AOA and distance according to an embodiment of the disclosure.

Part (a) of FIG. 4 shows a UWB data frame that can be transmitted or received. For example, the UWB data frame may be generated by the UWB communication module 430 (e.g., communication module 190 in FIG. 1). The UWB data frame may include a SYNC field 410 for temporal synchronization with an external electronic device (not shown), a SFD (start of frame delimiter) field 412 indicating the end of SYNC, a GAP field 414, and/or an STS (scrambled timestamp sequence) field 416 for preventing an attack (e.g., relay attack) on data included in the UWB data frame. Here, the GAP field may refer to an interval where no signal is transmitted or received. In various embodiments of the disclosure, among the fields of the UWB data frame, timestamp values may be included in the SYNC field 410 and the STS field 416. The timestamp values included in the SYNC field 410 and the STS field 416 may be used by the electronic device 101 to measure the distance to an external electronic device.

The electronic device (e.g., electronic device 101 in FIG. 1) may include at least three UWB antennas. For example, the electronic device (e.g., electronic device 101 in FIG. 1) may include a UWB communication module 430 (e.g., communication module 190 in FIG. 1), at least one switch (e.g., first switch 440), and at least one UWB antenna (e.g., first UWB antenna 450). For example, when the electronic device includes three UWB antennas, it may receive a UWB data frame while switching between the first antenna 450, the second antenna 452, and the third antenna 454. For example, the first antenna 450 and the second antenna 452 may be used as a first antenna set, and the second antenna 452 and the third antenna 454 may be used as a second antenna set. In this case, the electronic device may include three switches 440, 442, and 444. In parts (b) and (c) of FIG. 4, the electronic device is depicted as including three switches that can implement both the first antenna set and the second antenna set. However, if the first antenna set and a third antenna set (e.g., first antenna 450 and third antenna 454) are used, the electronic device may be configured to select the second antenna 452 and the third antenna 454 by using only one switch.

The electronic device may receive one UWB data frame by using the first antenna set and the second antenna set and measure the direction of or the distance to the external electronic device. For example, the electronic device may receive a portion of a UWB data frame by using the first antenna set and receive the other portion thereof by using the second antenna set. Then, the electronic device may determine the direction to the external electronic device based on at least some of the AOAs measured by using the first antenna set and the second antenna set.

In an embodiment, with reference to parts (b) and (c) of FIG. 4, the electronic device (e.g., electronic device 101 in FIG. 1) may include a UWB communication module 430 (e.g., communication module 190 in FIG. 1), three switches 440, 442, and 444, and three UWB antennas (e.g., first UWB antenna 450, second UWB antenna 452, and third UWB antenna 454). For example, the UWB communication module 430 may include a first port 432 capable of both transmitting and receiving UWB signals, and a second port 434 capable of receiving UWB signals only. The first switch 440 is connected to the first port 432 of the UWB communication module 430 to select one of the first UWB antenna 450 and the second switch 442. The second switch 442 is connected to the second UWB antenna 452 to select one of the first port 432 and the second port 434 of the UWB communication module 430. The third switch 444 is connected to the second port 434 of the UWB communication module 430 to select one of the second switch 442 and the third UWB antenna 454. The UWB communication module 430 may control the first to third switches 440, 442, and 444 that are electrically connected depending upon whether to use the first to third UWB antennas 450, 452, and 454 for transmission or reception.

For reference, the electronic device transmitting a UWB signal (e.g., master/slave anchor) may transmit a UWB data frame by connecting the first port 432 of the UWB communication module 430 to the first UWB antenna 450 or the second UWB antenna 452.

Parts (b) and (c) of FIG. 4 illustrate the settings of the electronic device 101 to measure two AOAs, and part (d) of FIG. 4 depicts the two AOAs measured according to the settings of parts (b) and (c) of FIG. 4.

Part (b) of FIG. 4 illustrates the settings of the electronic device 101 for measuring the AOA 460 shown in part (d) of FIG. 4. The electronic device 101 may perform an antenna switching operation while receiving one UWB data frame. The electronic device may receive a first portion 418 including the SYNC field 410 and the SFD field 412 of UWB data by using the first antenna 450 and the second antenna 452. In this case, as shown in part (b) of FIG. 4, the first switch 440 may select the first UWB antenna 450, the third switch 444 may select the second switch 442, and the second switch 442 may select the second UWB antenna 452. For example, the first port 432 of the UWB communication module 430 may be connected to the first UWB antenna 450 and the second port 434 thereof may be connected to the second UWB antenna 452 so as to receive the first portion 418 including the SYNC field 410 and the SFD field 412 of the single UWB data frame.

Part (c) of FIG. 4 illustrates the settings of the electronic device 101 for measuring the AOA 462 shown in part (d) of FIG. 4. The electronic device 101 may receive the second portion 420 including the STS field 416 of UWB data by using the second antenna 452 and the third antenna 454. For example, the electronic device 101 may receive the first portion 418 of the UWB data frame by using the first antenna 450 and the second antenna 452, and may configure the first to third switches 440, 442, and 444 as shown in part (c) of FIG. 4 to utilize the second antenna 452 and the third antenna 454 while receiving the GAP field following the first portion 418. For example, the settings of the first to third switches 440, 442, and 444 shown in part (c) of FIG. 4 may be configured during the GAP field 414 between the SFD field 412 and the STS field 416. The UWB communication module 430 (e.g., communication module 190 in FIG. 1) of the electronic device 101 may detect the SFD field 412 and change the settings of the first to third switches 440, 442, and 444 during the GAP field 414. For example, the first switch 440 may select the second switch 442, the second switch 442 may select the second UWB antenna 452, and the third switch 444 may select the third UWB antenna 454. For example, the first port 432 of the UWB communication module 430 may be connected to the second UWB antenna 452 and the second port 434 thereof may be connected to the third UWB antenna 454 so as to receive the second portion 420 including the STS field 416 of the UWB data frame.

The electronic device may determine the direction to the external electronic device based on at least some of the AOA measured through the first antenna set and the AOA measured through the second antenna set.

Although a UWB data frame including one STS field has been described in part (a) of FIG. 4, a case where two STS fields are included as shown in part (a) of FIG. 5 described below may also be applicable. For example, when using a UWB data frame including two STS fields, the electronic device 101 may measure the AOA by changing the switch settings once more or using a third antenna set (e.g., second antenna 452 and third antenna 454). If the electronic device includes more UWB antennas, the antenna sets may be formed in more varied ways. For example, if the electronic device includes one more UWB antenna, a total of six antenna sets can be formed ((first antenna, second antenna), (first antenna, third antenna), (first antenna, fourth antenna), (second antenna, third antenna), (second antenna, fourth antenna), (third antenna, fourth antenna)). In addition, the electronic device may change the order of the antenna sets to receive the UWB data frame by changing the settings of the switches. For example, the electronic device may receive a UWB data frame by using the first antenna set and then receive the UWB data frame by using the second antenna set or may receive a UWB data frame by using the third or fourth antenna set.

Figure 5:
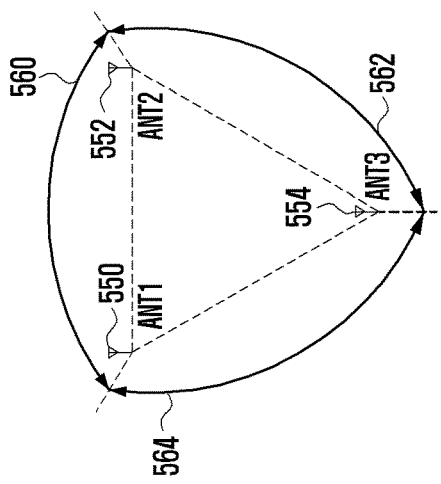
FIG. 5 illustrates a situation where the electronic device measures the AOA and distance according to an embodiment of the disclosure.
Figure 5:
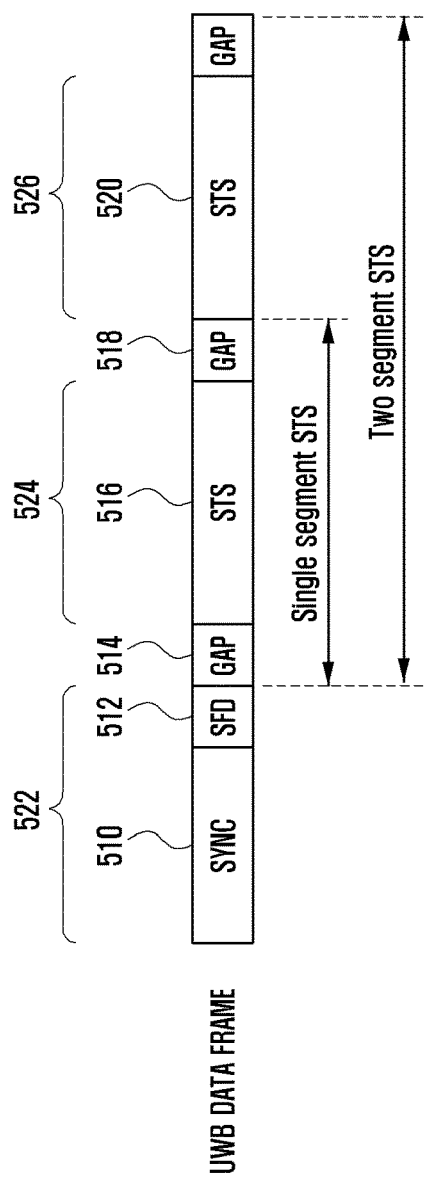
Figure 5:
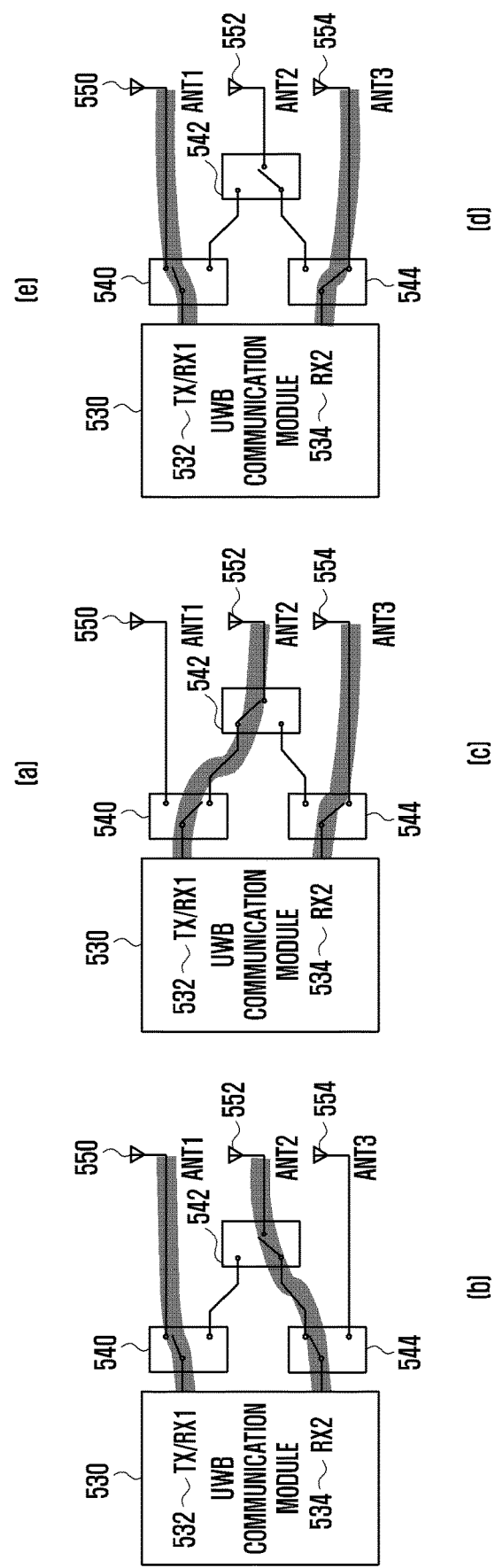

FIG. 5 illustrates a situation where the electronic device measures the AOA and distance according to an embodiment of the disclosure.

Part (a) of FIG. 5 illustrates a UWB data frame that can be transmitted or received. The UWB data frame may be generated by the UWB communication module 530 (e.g., communication module 190 in FIG. 1) of the electronic device. The UWB data frame may include a SYNC field 510 for temporal synchronization with an external electronic device (not shown), a SFD field 512 indicating the end of SYNC, first and second GAP fields 514 and 518, and first and second STS fields 516 and 520 for preventing an attack (e.g., relay attack) on data included in the UWB data frame. Here, the first and second GAP fields 514 and 518 may indicate intervals where no signal is transmitted or received. In an embodiment of the disclosure, among the fields of the UWB data frame, timestamp values may be included in the SYNC field 510, the first STS field 516, and/or the second STS field 520. The timestamp value included in the SYNC field 510, the first STS field 516, or the second STS field 520 may be used by the electronic device 101 to measure the distance to the external electronic device.

The electronic device (e.g., electronic device 101 in FIG. 1) may include at least some of the components of the electronic device shown in FIG. 4. For example, when the electronic device includes three UWB antennas, the electronic device may receive a UWB data frame while switching between the first antenna 550, the second antenna 552, and the third antenna 554. For example, the first antenna 550 and the second antenna 552 may be used as the first antenna set, the second antenna 552 and the third antenna 554 may be used as the second antenna set, and the third antenna 554 and the first antenna 550 may be used as the third antenna set. In this case, the electronic device may include three switches 540, 542, and 544.

The electronic device may receive one UWB data frame by using the first antenna set, the second antenna set, and the third antenna set and measure the direction or the distance to the external electronic device. For example, the electronic device may receive different portions of one UWB data frame by using the first antenna set, the second antenna set, and/or the third antenna set. The electronic device may measure the AOA based on each of the different portions of one UWB data frame received through the first antenna set, the second antenna set, and/or the third antenna set and determine the direction of the external electronic device based on at least some of the measured AOAs.

In an embodiment, with reference to parts (b) to (d) of FIG. 5, the electronic device (e.g., electronic device 101 in FIG. 1) may include a UWB communication module 530 (e.g., communication module 190 in FIG. 1), three switches 540, 542, and 544 (e.g., switches 440, 442, and 444 in FIG. 4), and three UWB antennas including a first UWB antenna 550, a second UWB antenna 552 and a third UWB antenna 554 (e.g., antennas 450, 452, and 454 in FIG. 4). For example, the UWB communication module 530 may include a first port 532 capable of both transmitting and receiving a UWB signal, and a second port 534 capable of receiving a UWB signal only. The first switch 540 may be connected to the first port 532 of the UWB communication module 530 to select one of the first UWB antenna 550 and the second switch 542. The second switch 542 may be connected to the second UWB antenna 552 to select one of the first port 532 and the second port 534 of the UWB communication module 530. The third switch 544 may be connected to the second port 534 of the UWB communication module 530 to select one of the second switch 542 and the third UWB antenna 554. The UWB communication module 530 may control the first to third switches 540, 542, and 544 that are electrically connected depending upon whether to use the first to third UWB antennas 550, 552, and 554 for transmission or reception. Alternatively, the processor (e.g., processor 120 in FIG. 1) may control the first to third switches 540, 542, and 544 that are electrically connected depending upon whether to use the first to third UWB antennas 550, 552, and 554 for transmission or reception. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

For reference, the electronic device transmitting a UWB signal (e.g., master/slave anchor) may transmit a UWB data frame by connecting the first port 532 of the UWB communication module 530 to the first UWB antenna 550 or the second UWB antenna 552.

Parts (b) to (d) of FIG. 5 5 illustrate a situation where the electronic device 101 selects two UWB antennas (or antenna sets) out of three UWB antennas 550, 552, and 554 to receive one UWB data frame according to an embodiment of the disclosure. The electronic device may perform an antenna switching operation while receiving one UWB data frame. The electronic device may receive first data 522 including the SYNC field 510 and the SFD field 512 of the UWB data by using the first antenna 550 and the second antenna 552. In this case, the electronic device may select the first and second UWB antennas 550 and 552 (e.g., first antenna set) among the three UWB antennas 550, 552, and 554 as shown in part (b) of FIG. 5. In part (b) of FIG. 5, the first switch 540 may select the first UWB antenna 550, the second switch 542 may select the third switch 544, and the third switch 544 may select the second UWB antenna 552. For example, the first port 532 of the UWB communication module 530 may be connected to the first UWB antenna 550 and the second port 534 may be connected to the second UWB antenna 552, so that the first data 522 including the SYNC field 510 and the SFD field 512 of the UWB data frame can be received.

To receive second data 524 including the first STS field 516 of the UWB data frame, the electronic device 101 may select the second and third UWB antennas 552 and 554 (e.g., second antenna set) among the three UWB antennas 550, 552, and 554 as shown in part (c) of FIG. 5. For example, when receiving the GAP field 514 following the first data 522 after receiving the first data 522 of the UWB data frame by using the first antenna 550 and the second antenna 552, the electronic device 101 may configure the settings of the first to third switches 540, 542, and 544 as shown in part (c) of FIG. 5 to use the second antenna 552 and the third antenna 554. For example, the settings of the first to third switches 540, 542, and 544 may be configured as shown in part (c) of FIG. 5 during the GAP field 514 between the SFD field 512 and the first STS field 516. The UWB communication module 530 (e.g., communication module 190 in FIG. 1) of the electronic device 101 may detect the SFD field 512 and change the settings of the first to third switches 540, 542, and 544 during the GAP field 514. In part (c) of FIG. 5, when the first switch 540 selects the second switch 542, the second switch 542 may select the second UWB antenna 552, and the third switch 544 may select the third UWB antenna 554. For example, the first port 532 of the UWB communication module 530 may be connected to the second UWB antenna 552 and the second port 534 may be connected to the third UWB antenna 554, so that the second data 524 including the first STS field 516 of the UWB data frame can be received.

To receive third data 526 including the second STS field 520 of the UWB data frame, the electronic device 101 may select the third and first UWB antennas 554 and 550 (e.g. third antenna set) from among the three UWB antennas 550, 552, and 554 as shown in part (d) of FIG. 5. The settings of the first to third switches 540, 542, and 544 may be configured shown in part (d) of FIG. 5 during the GAP field 518 between the first STS field 516 and the second STS field 520. The UWB communication module 530 of the electronic device 101 may detect the STS field 516 and change the settings of the first to third switches 540, 542, and 544 during the GAP field 518. In part (d) of FIG. 5, the first switch 540 may select the first UWB antenna 550, and the third switch 544 may select the third UWB antenna 554. For example, the first port 532 of the UWB communication module 530 may be connected to the first UWB antenna 550 and the second port 534 may be connected to the third UWB antenna 554, so that the third data 526 including the second STS field 520 of the UWB data frame can be received.

Part (e) of FIG. 5 illustrates the AOA that can be measured when the electronic device 101 is configured as shown in parts (b) to (d) of FIG. 5. For example, when a UWB signal is received at an angle between 30 degrees and 150 degrees (560) relative to the electronic device 101, the electronic device 101 can obtain a valid AOA when configured as shown in part (b) of FIG. 5 (e.g., the first UWB antenna 550 and the second UWB antenna 552 are used). When a UWB signal is received at an angle between 270 degrees and 30 degrees (562), the electronic device 101 can obtain a valid AOA when configured as shown in part (c) of FIG. 5 (e.g., the second UWB antenna 552 and the third UWB antenna 554 are used). When a UWB signal is received at an angle between 150 degrees and 270 degrees (564), the electronic device 101 can obtain a valid AOA when configured as shown in part (d) of FIG. 5 (e.g., the first UWB antenna 550 and the third UWB antenna 554 are used).

Figure 6:
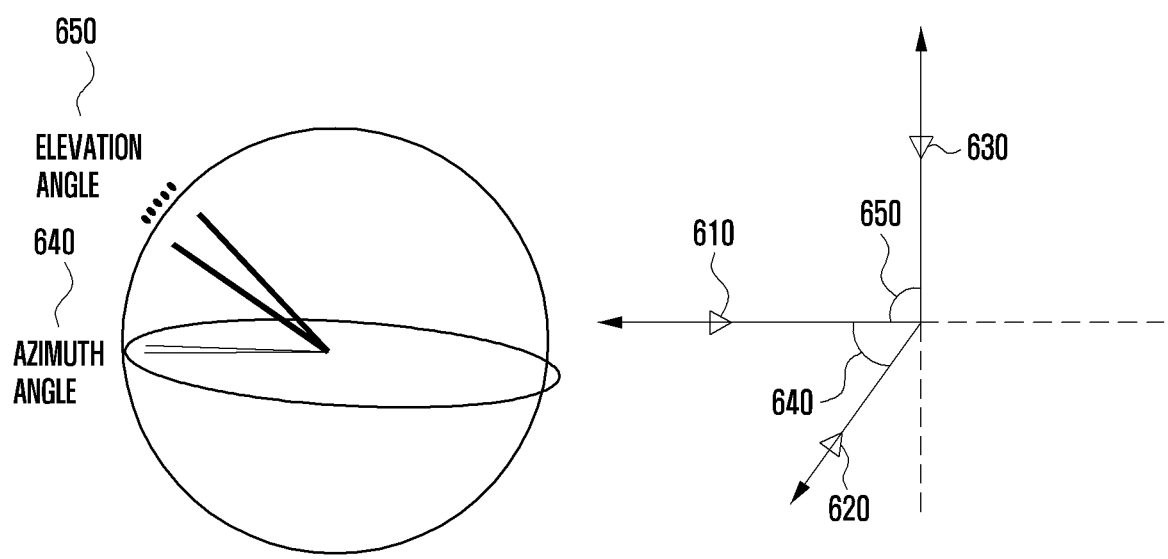
FIG. 6 illustrates a situation where the electronic device measures the elevation angle according to an embodiment of the disclosure.

FIG. 6 illustrates a situation where the electronic device measures the elevation angle according to an embodiment of the disclosure.

The electronic device (e.g., electronic device 101 in FIG. 1) may include at least three UWB antennas. For example, the electronic device (for example, electronic device 101 in FIG. 1) may include three UWB antennas 610, 620, and 630. Here, the first antenna 610, the second antenna 620, and the third antenna 630 may be placed on the same plane, or at least one antenna may be placed so as to be able to measure the altitude.

For example, the electronic device may measure the direction of an external electronic device by using the antennas placed on the same plane. For example, when a GAP field (e.g., GAP field 414 in FIG. 4) is included between the SYNC field (e.g., SYNC field 410 in FIG. 4) and the STS field (e.g., STS field 416 in FIG. 4) of a UWB data frame received by the electronic device, the electronic device may receive the first portion (e.g., first portion 418 in FIG. 4) including the SYNC field of the UWB data frame by using the first antenna 610 and the second antenna 620, and may perform antenna switching during the GAP field of the UWB signal to receive the second portion (e.g., second portion 420 in FIG. 4) including the STS field of the UWB data frame after the GAP field by using the second antenna 620 and the third antenna 630.

The electronic device may use the first and second antennas 610 and 620 and the second and third antennas 620 and 630 to measure the direction of and the distance to an external electronic device by performing an antenna switching operation based on separate segments of one UWB data frame. For example, the electronic device may measure a first AOA based on the first data of the UWB data frame obtained through the first antenna 610 and the second antenna 620, and may measure a second AOA by using the second antenna 620 and the third antenna 630. Then, the electronic device may determine the direction of the external electronic device at least partially based on the first AOA and the second AOA.

When the electronic device receives a UWB data frame through antenna switching and measures the AOA by using the UWB data frame, if at least one antenna is not placed on the same plane, the electronic device may estimate the elevation angle of the external electronic device.

Next, a description is given of a scheme for more accurately measuring the distance by using a plurality of UWB antennas according to certain embodiments of the disclosure.

Figure 7A:
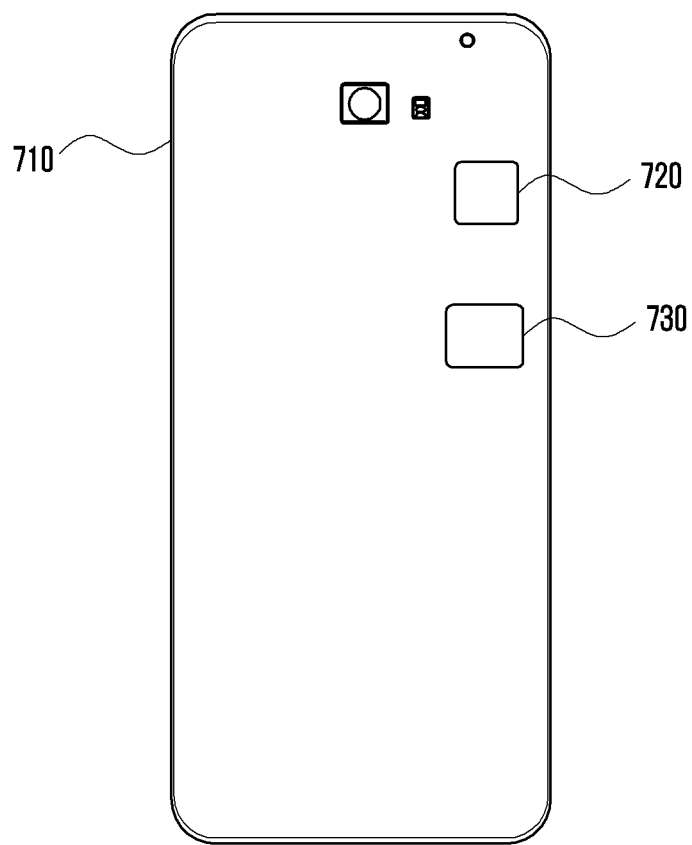
FIG. 7A illustrates an electronic device equipped with a plurality of UWB antennas according to an embodiment of the disclosure.
Figure 7B:
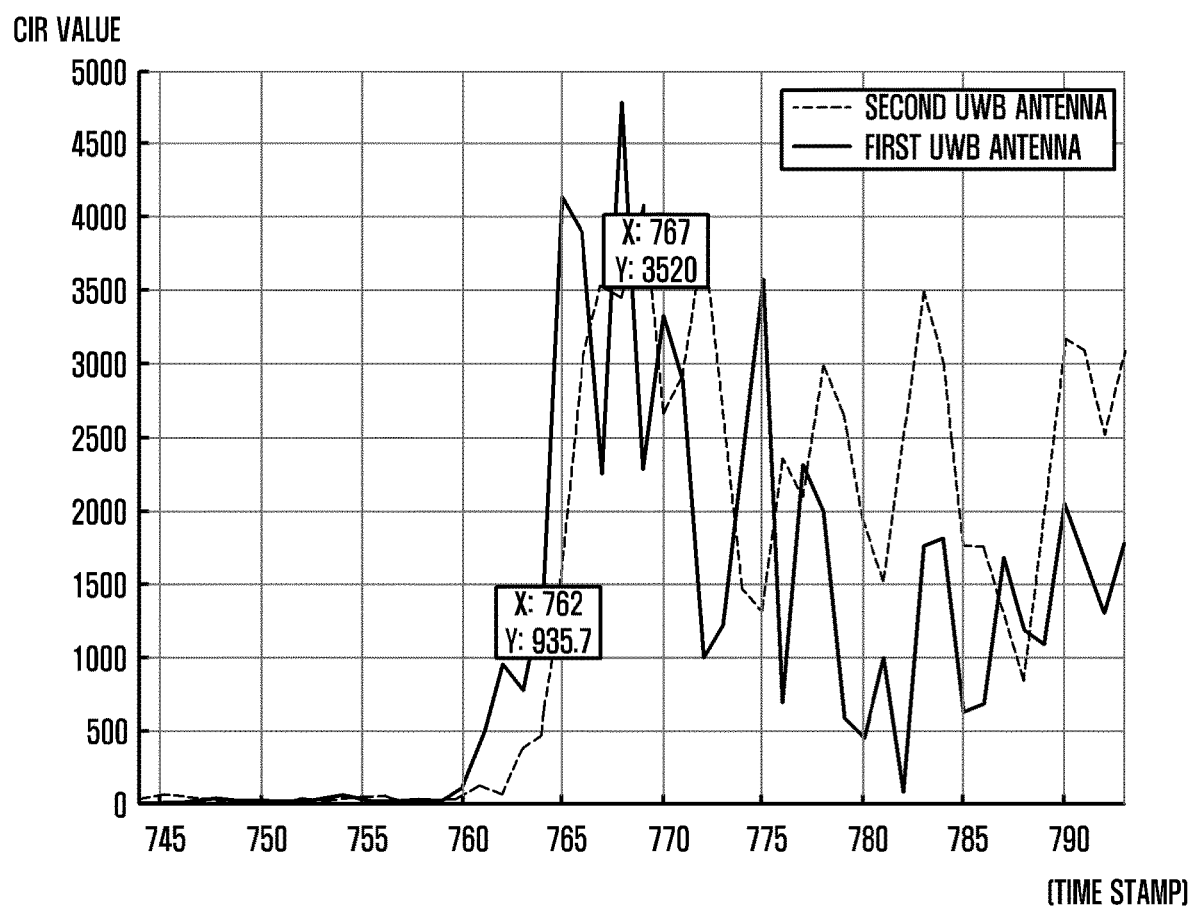
FIG. 7B illustrates measurements of the distance to an external electronic device by using the plurality of UWB antennas according to an embodiment of the disclosure.

FIG. 7A illustrates an electronic device equipped with a plurality of UWB antennas according to an embodiment of the disclosure. FIG. 7B illustrates measurements of the distance to an external electronic device by using the plurality of UWB antennas according to an embodiment of the disclosure.

With reference to FIG. 7A, the electronic device 710 (e.g., electronic device 101 in FIG. 1) may include, for example, two UWB antennas 720 and 730. As the two UWB antennas 720 and 730 are disposed apart in the electronic device 710, the reception environments of the UWB signal may be different. For example, only the second UWB antenna 730 may be placed in the user's pocket, or only the first UWB antenna 720 may be covered by a certain object.

FIG. 7B shows channel impulse responses (CIR) of the UWB antennas when only the second UWB antenna 730 is put in the user's pocket. In FIG. 7B, the X-axis represents the index of the timestamp measured at regular intervals, and the Y-axis represents the CIR value, which is a distance calculated using the measured signal. It can be seen from FIG. 7B that the first peak occurs at index 767 with a CIR value of 3520 for the first UWB antenna 720 and the first peak occurs at index 762 with a CIR value of 935.7 for the second UWB antenna 730. It can be seen from FIG. 7B that, even though the UWB antennas are included in the same electronic device 710, they may produce different CIR measurement values according to the environment around the UWB antennas. In certain embodiments, the timestamp can be determined in consideration of the CIR value measured using each UWB antenna. For example, among CIR values measured using each UWB antenna, the electronic device 710 may determine the final timestamp to be the timestamp associated with the minimum CIR value or the average CIR value. Alternatively, the electronic device 710 may determine the final timestamp to be the timestamp associated with a good signal state (figure of merit (FOM)).

If one UWB data frame is received in whole using the same antenna as in the case the conventional art, the environment around the UWB antenna may be not considered. For example, if a UWB data frame is received using the second UWB antenna 730, as the electronic device 710 cannot know the environment around the second UWB antenna 730, it has to use the received data as it is. On the other hand, according to certain embodiments of the disclosure, if the electronic device 710 receives a single UWB data frame while switching between the UWB antennas, it can measure the distance while taking advantage of the different surrounding environments of each UWB antenna.

Although two UWB antennas are used in FIGS. 7A and 7B, if the number of UWB antennas is increased, the method of determining the final distance can be considered in even more various ways. Accordingly, the electronic device 710 can measure the distance more accurately. It has been described above that the electronic device 710 according to an embodiment of the disclosure can receive the STS and SYNC fields while switching between three UWB antennas. However, to measure the distance using the STS and SYNC fields, the electronic device 710 may set a reference RMARKER (ranging marker) to the timestamp value at the time when the final distance is determined.

In the case of UWB communication, the SYNC field (e.g., SYNC field 410 in FIG. 4) of a UWB data frame may be at risk of being exposed to various attacks such as hacking by a malicious actors. In this regard, the electronic device that performs positioning may not use the SYNC field (e.g., SYNC field 410 in FIG. 4). The electronic device 710 according to an embodiment of the disclosure may also be exposed to risks from attacks. However, according to certain embodiments of the disclosure, because the UWB antenna (e.g., UWB antenna 450 in FIG. 4) used by the electronic device 710 to receive the SYNC field can be used once more to receive the STS field (e.g., STS field 416 in FIG. 4) (e.g., parts (b) and (d) of FIG. 4), if the distance measured by the same UWB antenna having received the SYNC and STS fields is different by a preset range, the electronic device 710 may presume that the external electronic device having transmitted the UWB data frame is not normal (e.g., malicious attacker). According to certain embodiments of the disclosure, if it is presumed that there has been an attack, the electronic device 710 may ignore only the information on the distance measured through reception of the SYNC field or may ignore all information on the attacked UWB data frame and perform measurement again.

FIGS. 8A to 8D illustrate the arrangement of antennas installed in the electronic device according to certain embodiments of the disclosure.

Figure 8A:
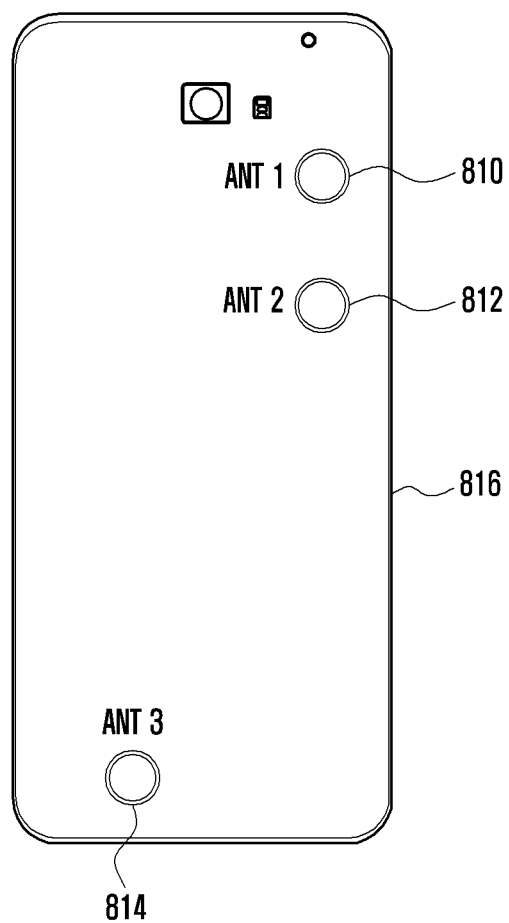
FIGS. 8A to 8D illustrate the arrangement of antennas in the electronic device according to certain embodiments of the disclosure.
Figure 8B:
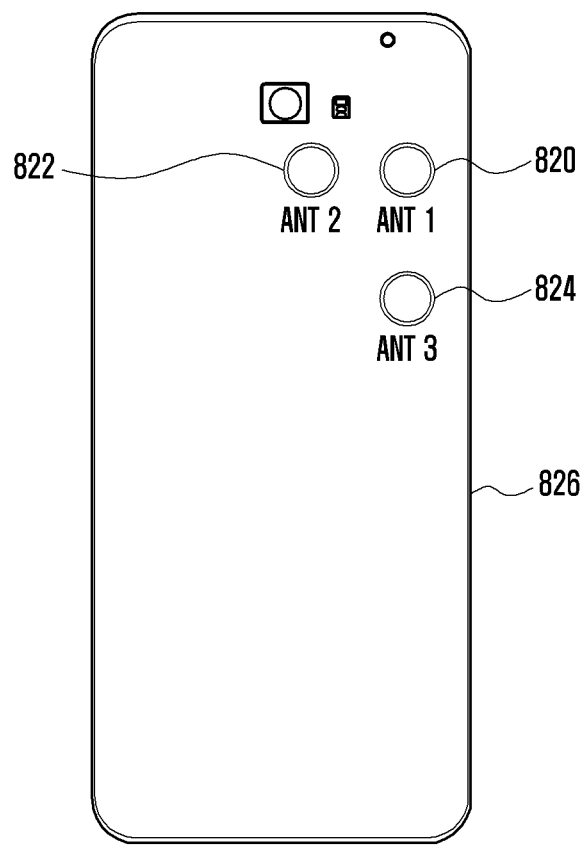
Figure 8C:
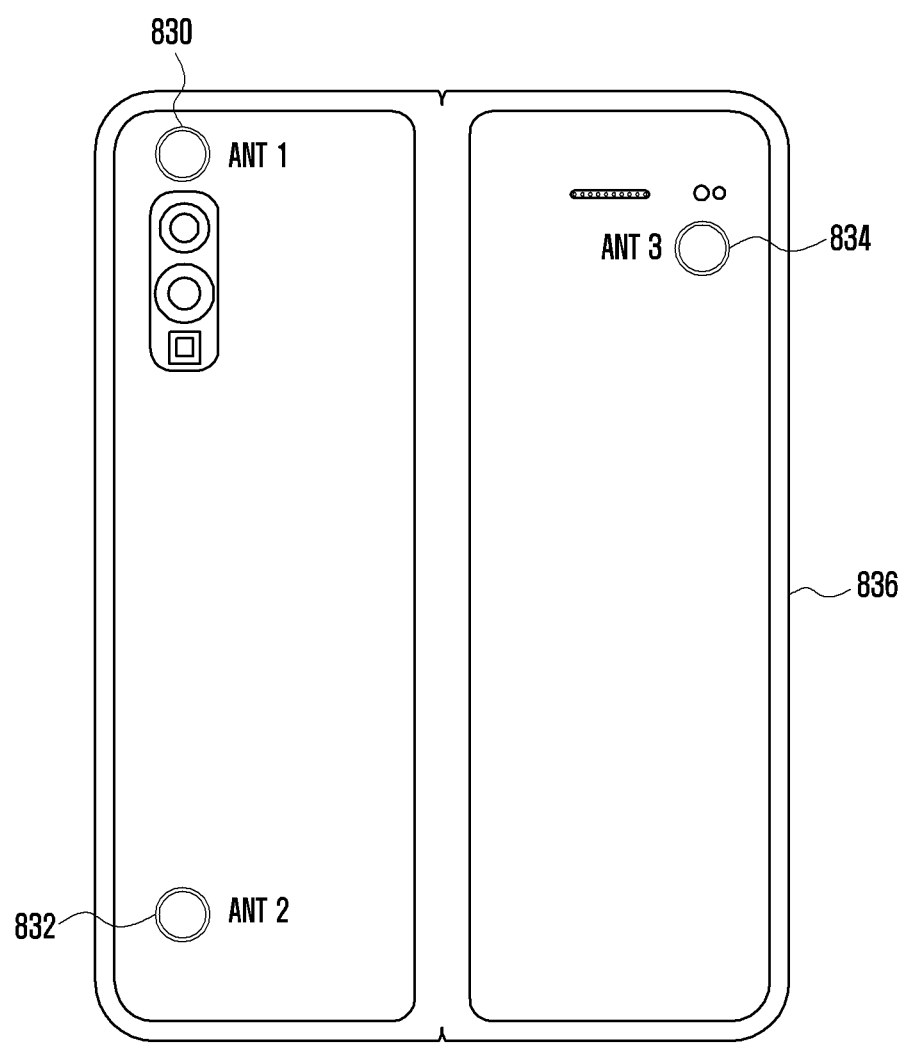
Figure 8D:
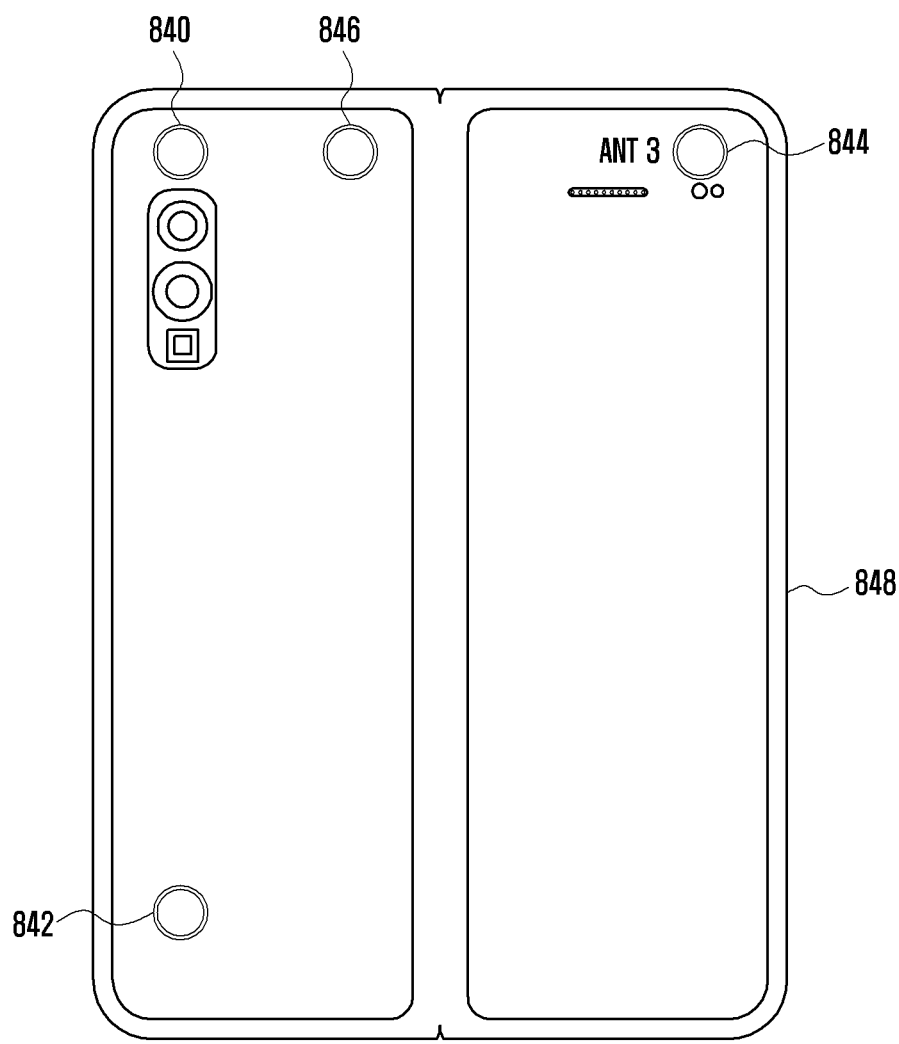

For example, the electronic device in FIGS. 8A and 8B may be a smartphone, and the electronic device in FIGS. 8C and 8D may be a foldable smartphone.

Both the electronic device 816 in FIG. 8A and the electronic device 826 in FIG. 8B may include three UWB antennas (indicia 810, 812, and 814 in FIG. 8A, indicia 820, 822, and 824 in FIG. 8B), but their arrangements may be different. In FIG. 8A, among the UWB antennas, the first antenna 810 and the second antenna 812 may be disposed close to each other and the third antenna 814 may be disposed relatively apart. When the UWB antennas are separately arranged in this way, some of the UWB antennas may be protected from impact on a specific portion of the device. If all three UWB antennas 810, 812, and 814 are arranged in a certain region as shown in FIG. 8B, the distance to the transmitting device measured by each UWB antenna may all be within an error range. The UWB antennas included in the electronic devices 816 and 826 of FIGS. 8A and 8B can be located on the same plane, so that the AOA of 360 degrees can be measured for the azimuth or elevation angle in the direction where the electronic device is placed. Alternatively, if the electronic devices 816 and 826 of FIGS. 8A and 8B are oriented so that they are perpendicular to the ground, the electronic device may measure the azimuth angle and the elevation angle.

The electronic device 836 in FIG. 8C may include three UWB antennas 830, 832, and 834, and the electronic device 848 in FIG. 8D may include four UWB antennas 840, 842, 844, and 846. The UWB antennas installed in the foldable electronic device may have different AOAs that can be measured according to the degree of folding of the electronic device. Even if the foldable electronic device 836 includes 3 UWB antennas 830, 832, and 834, when the foldable electronic device is fully unfolded, it can be seen that the UWB antennas are disposed on the same plane as shown in FIG. 8C. However, if the foldable electronic device is folded even a little, the altitude can be measured. As shown in FIG. 8D, when the electronic device 848 includes four UWB antennas 840, 842, 844, and 846, and the UWB antennas 840, 842, 844, and 846 are not all disposed on the same plane, the AOA can be measured in two or three dimensions. For example, when the electronic device 848 in FIG. 8D is folded, the AOA can be measured in two dimensions by using three UWB antennas 840, 846, and 842, and the AOA can be measured in three dimensions by using a subset of UWB antennas 840, 846, and 844 or another subset of UWB antennas 844, 846, and 842.

The electronic devices shown in FIGS. 8A to 8D are only examples, and the number, type and/or arrangement of UWB antennas may vary depending on the size, purpose, and usage of the electronic device. Patch antenna, array antenna, metal antenna, or PCB antenna can be used as the UWB antenna.

Figure 9:
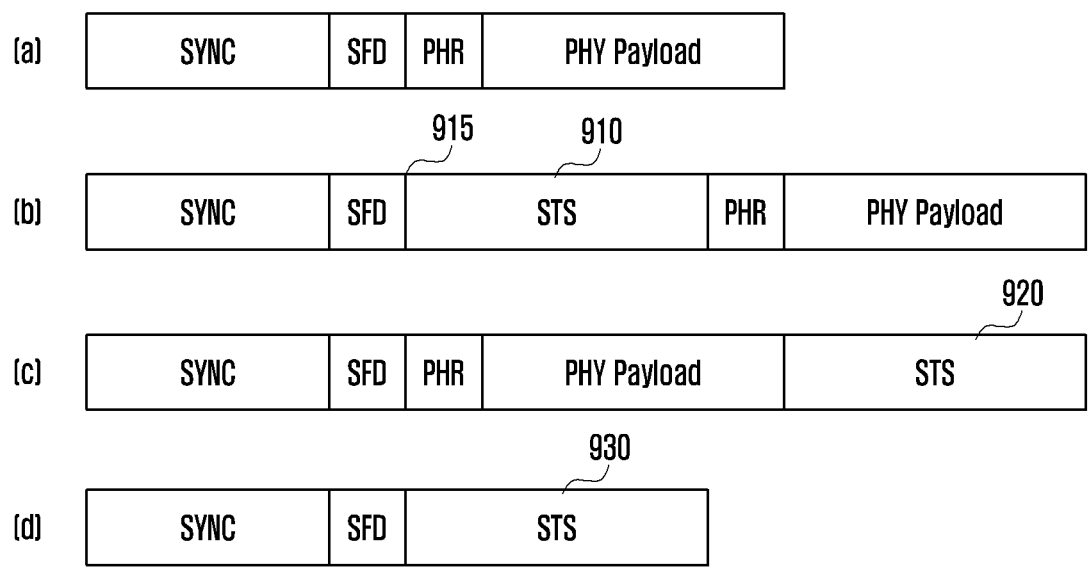
FIG. 9 shows examples of the format of a UWB data frame.

FIG. 9 shows examples of the format of a UWB data frame.

For example, the format of a UWB data frame can be varied as shown in parts (a) to (d) of FIG. 9. As described above, the UWB data frame may include at least some of a SYNC field for temporal synchronization with an external electronic device (not shown), an SFD field indicating the end of SYNC, a PHY (physical layer) payload field containing data to be transmitted, a PHR (PHY header) field indicating the header portion of the PHY, or an STS field for preventing an attack (e.g., relay attack) on the data contained in the UWB data frame.

The electronic device (e.g., electronic device 101 in FIG. 1) needs a RMARKER serving as a reference for measuring the distance to the transmitting device, and the RMARKER can be inserted at the end of the SFD field according to one embodiment.

In an embodiment, the electronic device may perform UWB antenna switching at the GAP field of the UWB data frame. In the UWB data frame, the GAP field can be inserted before or after the STS field. As the UWB data frame format shown in part (a) of FIG. 9 does not include an STS field, a GAP field cannot be included in the UWB data frame format shown in part (a) of FIG. 9, so the disclosure may be not applicable. If the electronic device attempts to measure the distance to or the AOA of an external electronic device while using the UWB data frame format shown in part (a) of FIG. 9, it may change the UWB data frame format to that shown in part (b), (c) or (d) of FIG. 9 through negotiation with the external electronic device.

In addition, as all the UWB data frame formats shown in parts (b) to (d) of FIG. 9 include the STS field 910, 920 or 930, the disclosure may be applicable. Although all the UWB data frame formats shown in parts (b) to (d) of FIG. 9 include a single STS field, the electronic device may divide the STS field into plural STS fields through negotiation with the external electronic device, where a GAP field (e.g., GAP field 518 in FIG. 5) may be inserted between the STS fields. When utilizing a UWB data frame format including plural STS fields, the electronic device can perform antenna switching at least as many times as the number of STS fields, and thus the number of switches and UWB antennas that can be included may increase.

For reference, the UWB communication modules 430 and 530 in FIGS. 4 and 5 include two ports, but the number of ports is not limited thereto. For example, if the number of ports of the UWB communication module increases, the number of switches and UWB antennas electrically connected thereto may also increase.

Figure 10:
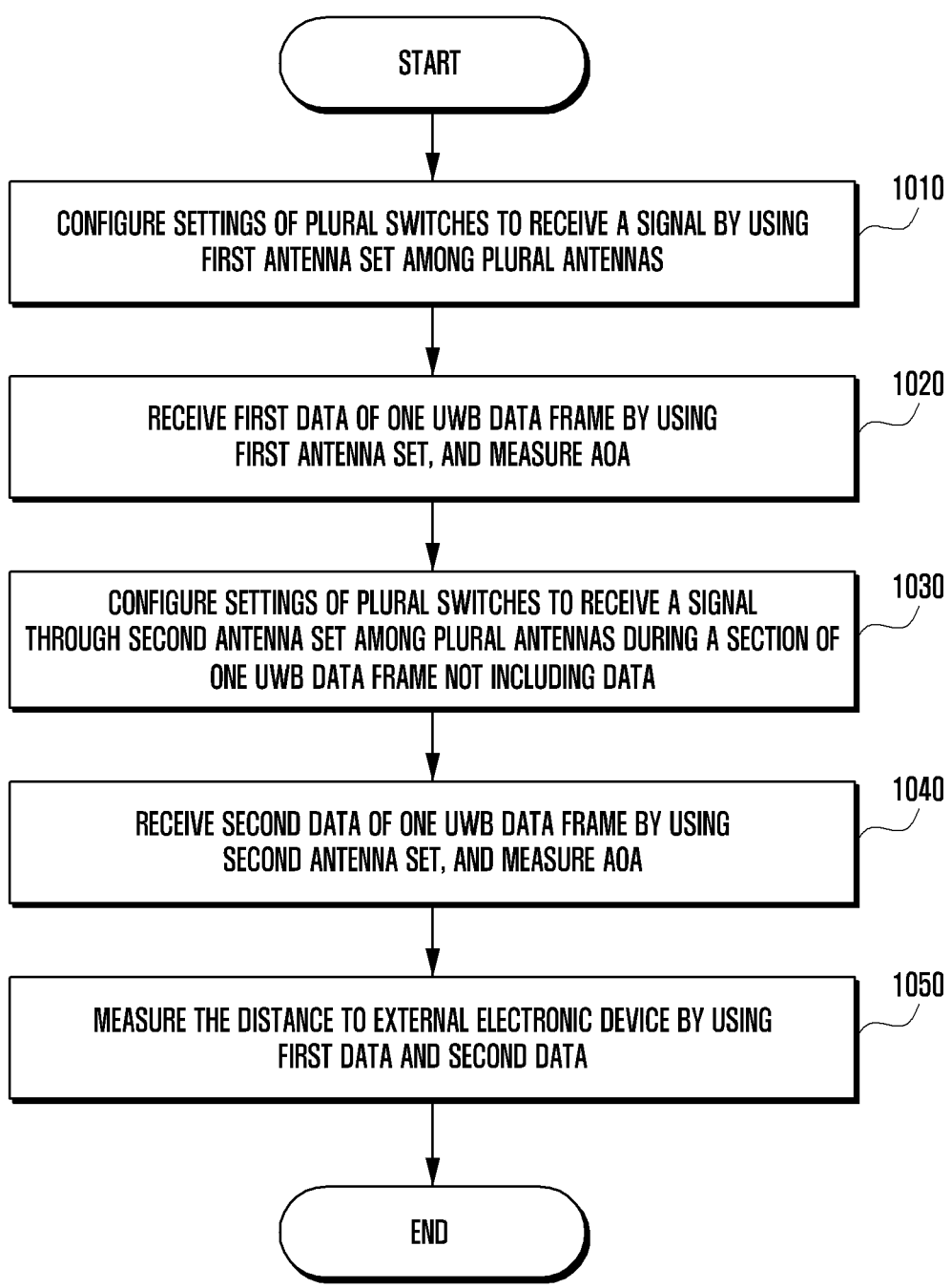
FIG. 10 is a flowchart of a procedure for the electronic device to measure the distance to and the AOA of an external electronic device according to an embodiment of the disclosure.

FIG. 10 is a flowchart of a procedure for the electronic device to measure the distance and the AOA of an external electronic device according to an embodiment of the disclosure.

At operation 1010, the electronic device (e.g., electronic device 101 in FIG. 1) may configure the settings of a plurality of switches to receive a signal by using a first antenna set among a plurality of antennas (e.g., part (b) of FIG. 4). In an embodiment, the plurality of antennas are antennas that receive a UWB signal. At least three antennas (e.g., first UWB antenna 450, second UWB antenna 452, and third UWB antenna 454 in FIG. 4) may be included in the electronic device 101. Each antenna set may include at least two antennas (e.g., first and second UWB antennas 450 and 452, or second and third UWB antennas 452 and 454 in FIG. 4). The plurality of switches (e.g., first switch 440, second switch 442 and third switch 444 in FIG. 4) may connect the ports (e.g., first port 432 and second port 434 in FIG. 4) of the communication module (e.g., communication module 430 in FIG. 4) to the antennas (e.g., first UWB antenna 450, second UWB antenna 452, and third UWB antenna 454 in FIG. 4). In the disclosure, each antenna set is described as including two antennas, but the antenna set may include a larger number of antennas.

At operation 1020, the electronic device 101 may receive first data of one UWB data frame by using the first antenna set (e.g., first UWB antenna 450 and second UWB antenna 452 in FIG. 4) and measure the AOA. In an embodiment, the first data (e.g., first data 418 in FIG. 4) of one UWB data frame may include a SYNC field (e.g., SYNC field 410 in FIG. 4). The electronic device 101 may cross-correlate the received SYNC field 410 with a SYNC sequence to calculate a channel impulse response (CIR). The electronic device 101 can find the timestamp of the first antenna set (e.g., antennas 450 and 452) and the AOA from the SYNC field 410 based on the calculated CIR. The AOA measured based on the received SYNC field 410 may be an azimuth angle (e.g., angle 460 in FIG. 4) or an altitude angle (e.g., angle 462 in FIG. 4).

At operation 1030, the communication module (e.g., communication module 430 in FIG. 4) of the electronic device 101 may configure the settings of the plural switches (e.g., part (c) of FIG. 4) to receive a signal through a second antenna set (e.g., second UWB antenna 452 and third UWB antenna 454 in FIG. 4) among the plurality of antennas during a section of one UWB data frame that does not include data. In an embodiment, the section of one UWB data frame that does not include data may be the GAP field (e.g., GAP field in FIG. 4). For example, the communication module 430 may detect the SFD field (e.g., SFD field 412 in FIG. 4) of one UWB data frame and configure the settings of the switches to receive a signal through the second antenna set (antennas 452 and 454) during the GAP field 414. The second antenna set (e.g., antennas 452 and 454) need not be mutually exclusive with the first antenna set (e.g., antennas 450 and 452), and may include at least one antenna not belonging to the first antenna set.

At operation 1040, the electronic device 101 may receive second data (e.g., second data 420 in FIG. 4) of one UWB data frame by using the second antenna set (antennas 452 and 454) and measure the AOA. In an embodiment, the second data 420 of one UWB data frame may include the STS field (e.g., STS field 416 in FIG. 4). The electronic device 101 may cross-correlate the received STS field 416 with a STS sequence to calculate a CIR. The electronic device 101 can find the timestamp of the second antenna set (antennas 452 and 454) and the AOA from the STS field 416 based on the calculated CIR. The AOA measured based on the received STS field 416 may be an altitude angle 462 or an azimuth angle 460. For example, the AOA measured based on the received first data and second data may be an elevation angle 462 and/or an azimuth angle 460.

At operation 1050, the electronic device 101 may measure the distance to the external electronic device by using the first data and the second data. For example, the electronic device 101 may receive plural UWB data frames and may find the distance to the external electronic device by using the timestamps of the first data and the second data obtained by repeating operations 1020 and 1040. The electronic device 101 may calculate the distance to the transmitting device by using the smallest value or the average value among a total of four timestamps (timestamps of the first antenna 450 and the second antenna 452 from the SYNC field 410 and timestamps of the second antenna 452 and the third antenna 454 from the STS field 416). When there is a common antenna belonging to the first antenna set and the second antenna set, the electronic device 101 can presume that an attack (or interference) has occurred if the difference between the measured distances deviates from a preset range. Upon presuming that an attack (or interference) has occurred, the electronic device 101 may determine a timestamp for measuring the distance to the transmitting device by ignoring the distance measured using the corresponding antenna and newly measuring the distance.

Figure 11:
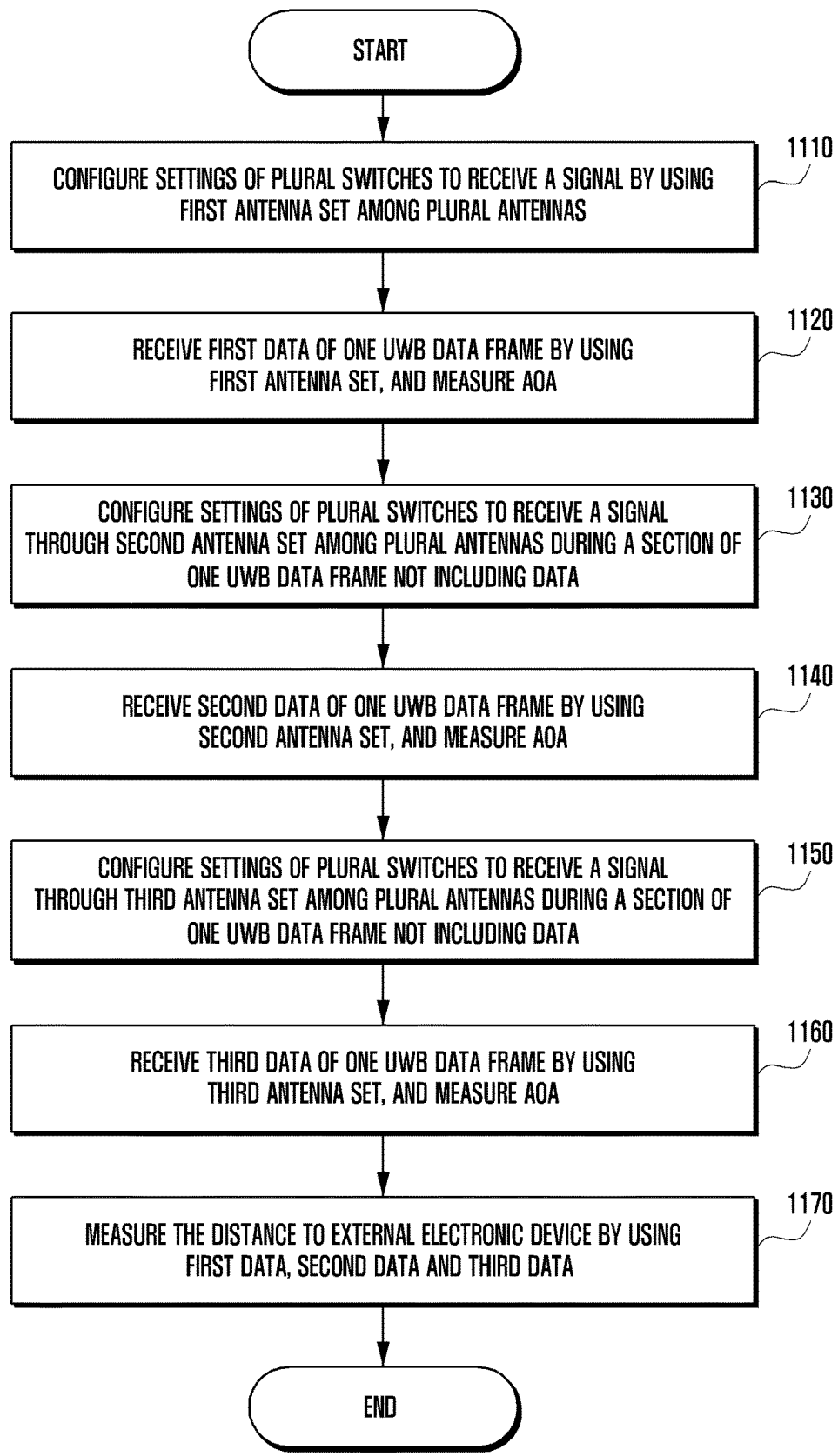
FIG. 11 is a flowchart of a procedure for the electronic device to measure the distance to and the AOA of a transmitting device in two dimensions according to an embodiment of the disclosure.

FIG. 11 is a flowchart of a procedure for the electronic device to measure the distance and the AOA of a transmitting device in two dimensions according to an embodiment of the disclosure.

At operation 1110, the electronic device (e.g., electronic device 101 in FIG. 1) may configure the settings of a plurality of switches to receive a signal by using a first antenna set formed from among a plurality of antennas (e.g., part (b) of FIG. 5). In an embodiment of the disclosure, the plurality of antennas are antennas capable of receiving a UWB signal, at least three antennas (e.g., first UWB antenna 550, second UWB antenna 552, and third UWB antenna 554 in FIG. 5) may be included in the electronic device 101, and each antenna set may include at least two antennas (e.g., antennas 550 and 552, antennas 552 and 554, or antennas 550 and 554 in FIG. 5). The plurality of switches (e.g., first switch 540, second switch 542, and third switch 544 in FIG. 5) may connect the ports (e.g., first port 532 and second port 534 in FIG. 5) of the communication module to the antennas (e.g., first UWB antenna 550, second UWB antenna 552, and third UWB antenna 554). In the disclosure, each antenna set is described as including two antennas, but it may include a larger number of antennas.

At operation 1120, the electronic device 101 may receive the first data (e.g., first data 522 in FIG. 5) of one UWB data frame by using the first antenna set (e.g., antennas 550 and 552 in FIG. 5) and measure the AOA. In an embodiment, the first data of one UWB data frame may include a SYNC field (e.g., SYNC field 510 in FIG. 5). The electronic device 101 may cross-correlate the received SYNC field 510 with a SYNC sequence to calculate a CIR. The electronic device 101 may find the timestamp of the first antenna set (antennas 550 and 552) and the AOA from the SYNC field 510 based on the calculated CIR. The AOA measured based on the received SYNC field 510 may be an AOA in two dimensions (e.g., AOA 560, 562, or 564).

At operation 1130, the communication module (e.g., communication module 530 in FIG. 5) of the electronic device 101 may configure the settings of the plurality of switches (e.g., part (c) of FIG. 5) to receive a signal through a second antenna set (e.g., antennas 552 and 554 in FIG. 5) among the plurality of antennas during a section of one UWB data frame that does not include data. In an embodiment, the section of one UWB data frame that does not include data may be the GAP field (e.g., GAP field 514 in FIG. 5). For example, the communication module 530 may detect the SFD field (e.g., SFD field 512 in FIG. 5) of one UWB data frame and configure the settings of the switches to receive a signal through the second antenna set (antennas 552 and 554) during the GAP field 514. The second antenna set (e.g., antennas 552 and 554) need not be mutually exclusive with the first antenna set (e.g., antennas 550 and 552), and may include at least one antenna not belonging to the first antenna set.

At operation 1140, the electronic device 101 may receive second data (e.g., second data 524 in FIG. 5) of one UWB data frame by using the second antenna set (antennas 552 and 554) and measure the AOA. In an embodiment, the second data of one UWB data frame may include the STS field (e.g., STS field 516 in FIG. 5). The electronic device 101 may cross-correlate the received STS field 516 with a STS sequence to calculate a CIR. The electronic device 101 can find the timestamp of the second antenna set (antennas 552 and 554) and the AOA from the STS field 516 based on the calculated CIR. The AOA measured based on the received STS field 516 may be an AOA in two dimensions (e.g., AOA 560, 562, or 564).

At operation 1150, the communication module 530 of the electronic device 101 may configure the settings of the plurality of switches (e.g., part (d) of FIG. 5) to receive a signal through a third antenna set (e.g., antennas 550 and 554 in FIG. 5) among the plurality of antennas during a section of one UWB data frame that does not include data. In an embodiment, the section of one UWB data frame that does not include data may be the GAP field (e.g., GAP field 518 in FIG. 5). For example, the communication module 530 may detect the SFD field (e.g., SFD field 516 in FIG. 5) of one UWB data frame and configure the settings of the switches to receive a signal through the third antenna set (antennas 550 and 554) during the GAP field 518.

At operation 1160, the electronic device 101 may receive third data (e.g., third data 526 in FIG. 5) of one UWB data frame by using the third antenna set (antennas 550 and 554) and measure the AOA. In an embodiment, the third data of one UWB data frame may include the STS field (e.g., STS field 520 in FIG. 5). The electronic device 101 may cross-correlate the received STS field 520 with a STS sequence to calculate a CIR. The electronic device 101 can find the timestamp of the third antenna set (antennas 550 and 554) and the AOA from the STS field 520 based on the calculated CIR. The AOA measured based on the received STS field 520 may be an AOA in two dimensions (e.g., AOA 560, 562 or 564).

At operation 1170, the electronic device 101 may measure the distance to the transmitting device by using the first data, the second data, and the third data. For example, the electronic device 101 may receive more UWB data frames and may find the distance to the transmitting device by using the timestamps of the first to third data obtained by repeating operations 1120, 1140, and 1160. The electronic device 101 may calculate the distance to the transmitting device by using the smallest value or the average value among a total of six timestamps (timestamps of the first antenna 550 and the second antenna 552 from the SYNC field 510, timestamps of the second antenna 552 and the third antenna 554 from the STS field 516, and timestamps of the first antenna 550 and the third antenna 554 from the STS field 520). When there is a common antenna belonging to the first to third antenna sets, the electronic device 101 may presume that an attack (or interference) has occurred if the difference between the measured distances deviates from a preset range. Upon presuming that an attack (or interference) has occurred, the electronic device 101 may measure the distance to the transmitting device by ignoring the distance measured using the corresponding antenna and newly measuring the distance. In one embodiment, when the first antenna 550, the second antenna 552, and the third antenna 554 are not all on the same plane, it is possible to measure the AOA in three dimensions. The electronic device 101 may determine three different distances based on signals received by the first, second, and third antenna sets and may determine the shortest distance among the three distances as the distance between the devices.

Figure 12:
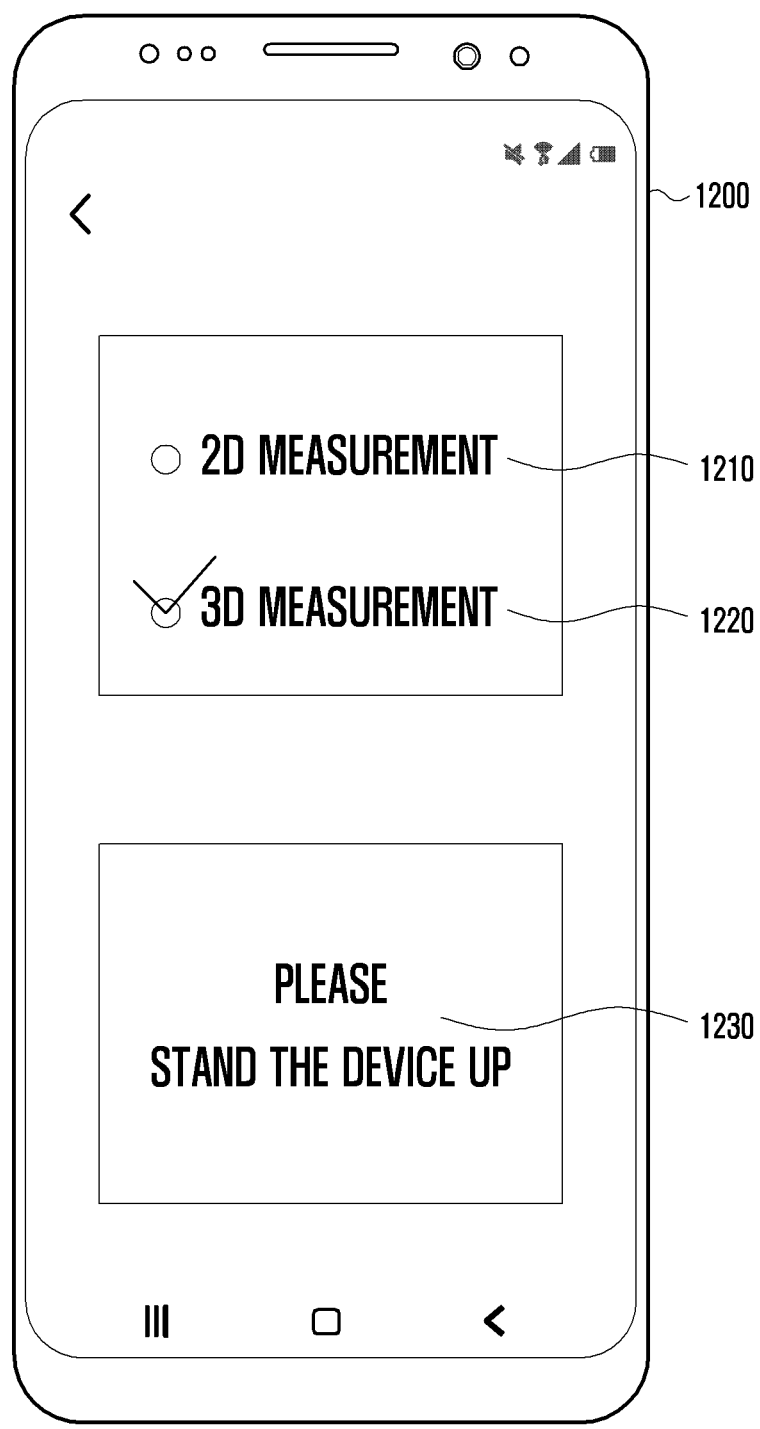
FIG. 12 illustrates a configuration screen of an application that performs measurement about an external electronic device according to an embodiment of the disclosure.

FIG. 12 illustrates a configuration screen of an application that performs measurement about an external electronic device according to an embodiment of the disclosure.

In one embodiment, the electronic device 1200 may include three UWB antennas on the same plane. For example, if the user wants to measure the AOA in two dimensions, a 2D measurement option 1210 can be selected. The electronic device can measure the AOA in two dimensions when placed on the floor or on a desk. In another example, if the user wants to measure the AOA in three dimensions, a 3D measurement option 1220 can be selected in the electronic device. When the user selects the 3D measurement option 1220, the electronic device may measure the AOA while being flat relative to the ground, and then output a notification "Please stand the device up" (1230) to the user. The user can stand the electronic device up at the point of view of the azimuth angle calculated in two dimensions. For example, if the azimuth angle calculated in two dimensions is 30 degrees, the user must stand the electronic device up after rotating the electronic device 30 degrees. Although the notification is output on the display in FIG. 12, it may be output as a voice message.

Certain embodiments of the disclosure may be applied to an application that finds another electronic device or tracks the location of a specific electronic device. For example, when the user rotates the electronic device left or right or up and down, the azimuth angle changes correspondingly, so that an external electronic device may be easily found without movement. As another example, the height of the transmitting device may be measured using the elevation angle and distance.

According to an embodiment of the disclosure, an electronic device may include: an ultra wide band (UWB) communication module (e.g., communication module 430 in FIG. 4, or communication module 530 in FIG. 5); a plurality of antennas (e.g. antennas 450, 452, and 454 in FIG. 4, or antennas 550, 552, and 554 in FIG. 5); and a processor operatively connected to the UWB communication module, wherein the UWB communication module (e.g., communication module 430 in FIG. 4, or communication module 530 in FIG. 5) may be configured to: receive first data (e.g., first data 418 in FIG. 4 or first data 522 in FIG. 5) of an UWB data frame from an external electronic device by using a first antenna set including at least two antennas among the plurality of antennas to measure a first angle of arrival (AOA) (e.g., AOA 460 in FIG. 4, or AOA 560 in FIG. 5); receive second data (e.g., second data 420 in FIG. 4 or second data 524 in FIG. 5) of the UWB data frame by using a second antenna set including at least two antennas among the plurality of antennas to measure a second AOA e.g., (AOA 462 in FIG. 4, or AOA 562 in FIG. 5), where the second antenna set is configured during a section of the UWB data frame that does not include data (e.g., GAP 414 in FIG. 4, or GAP 514 in FIG. 5); and measure a direction of the external electronic device by using the first AOA 460 or 560 and the second AOA 462 or 562.

In an embodiment, if at least one of the plurality of antennas is not located on the same plane as other antennas, the UWB communication module of the electronic device may be configured to measure an azimuth angle or elevation angle of the external electronic device relative to the electronic device based on the first AOA and the second AOA.

In an embodiment, the UWB communication module may be configured to further measure the distance between the electronic device and the external electronic device by using the first data and/or the second data.

In an embodiment, when the distance between the electronic device and the external electronic device measured using a signal received by a common antenna belonging to the first antenna set and the second antenna set is out of a preset range, the UWB communication module of the electronic device may be configured to discard the signal received by the common antenna.

In an embodiment, the UWB communication module 430 of the electronic device may be configured to measure the distance between the electronic device and the external electronic device based on a signal having a highest magnitude (e.g., CIR value in FIG. 7B) among signals received through the first antenna set and the second antenna set.

In an embodiment, the UWB communication module (e.g., communication module 530 in FIG. 5) of the electronic device may be configured to: receive third data (e.g., third data 526 in FIG. 5) of the UWB data frame by using a third antenna set including at least two antennas among the plurality of antennas to measure a third AOA (e.g., AOA 564), where the third antenna set is configured during another section of the UWB data frame that does not include data (e.g., GAP 518 in FIG. 5); and measure the direction of the external electronic device by using the first AOA, the second AOA, and the third AOA.

In an embodiment, if the plurality of antennas having received the first data, the second data, and the third data are located on the same plane, the first AOA, the second AOA, and the third AOA are each an AOA on a two-dimensional plane of the external electronic device relative to the electronic device.

In an embodiment, the UWB communication module of the electronic device may be configured to further measure the distance between the electronic device and the external electronic device based on at least some of the signals received through the first to third antenna sets.

In an embodiment, the UWB communication module of the electronic device may be configured to a shortest distance to the external electronic device measured based on signals received by the first through third antenna sets as the distance between the electronic device and the external electronic device.

In an embodiment, when the distance between the electronic device and the external electronic device measured using a signal received by a common antenna belonging to the first through third antenna sets is out of a preset range, the UWB communication module of the electronic device may be configured to discard the signal received by the common antenna.

According to an embodiment of the disclosure, an operation method for the electronic device may include: receiving first data (e.g., first data 418 in FIG. 4 or first data 522 in FIG. 5) of an UWB data frame from an external electronic device by using a first antenna set including at least two antennas among plurality of antennas to measure a first angle of arrival (AOA) (e.g., AOA 460 in FIG. 4, or AOA 560 in FIG. 5); receiving second data (e.g., second data 420 in FIG. 4 or second data 524 in FIG. 5) of the UWB data frame by using a second antenna set including at least two antennas among the plurality of antennas to measure a second AOA (e.g., AOA 462 in FIG. 4, or AOA 562 in FIG. 5), where the second antenna set is configured during a section of the UWB data frame that does not include data;

and measuring the direction of the external electronic device by using the first AOA and the second AOA.

In an embodiment, the operation method for the electronic device may include measuring, if at least one of the plurality of antennas is not located on the same plane as other antennas, an azimuth angle or elevation angle of the external electronic device relative to the electronic device based on the first AOA and the second AOA.

In an embodiment, the operation method for the electronic device may include measuring the distance between the electronic device and the external electronic device by using the first data and/or the second data.

In an embodiment, the operation method for the electronic device may include discarding, if the distance between the electronic device and the external electronic device measured using a signal received by a common antenna belonging to the first antenna set and the second antenna set is out of a preset range, the signal received by the common antenna.

In an embodiment, the operation method for the electronic device may include measuring the distance between the electronic device and the external electronic device based a signal having the highest magnitude (e.g., CIR value in FIG. 7B) among signals received through the first antenna set and the second antenna set.

In an embodiment, the operation method for the electronic device may further include: receiving third data (e.g., third data 526 in FIG. 5) of the UWB data frame by using a third antenna set including at least two antennas among the plurality of antennas to measure a third AOA (e.g., AOA 564), where the third antenna set is configured during another section of the UWB data frame that does not include data (e.g., GAP 518 in FIG. 5); and measuring the direction of the external electronic device by using the first AOA, the second AOA, and the third AOA.

In the operation method for the electronic device of an embodiment, if the plurality of antennas having received the first data, the second data, and the third data are located on the same plane, the first AOA, the second AOA, and the third AOA may each be an AOA on a two-dimensional plane of the external electronic device relative to the electronic device.

In an embodiment, the operation method for the electronic device may further include measuring the distance between the electronic device and the external electronic device based on at least some of the signals received through the first to third antenna sets.

In an embodiment, the operation method for the electronic device may include determining a shortest distance to the external electronic device measured based on signals received by the first through third antenna sets as the distance between the electronic device and the external electronic device.

In an embodiment, the operation method for the electronic device may include discarding, if the distance between the electronic device and the external electronic device measured using a signal received by a common antenna belonging to the first through third antenna sets is out of a preset range, the signal received by the common antenna.

In addition, it is possible to provide various other embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
an ultra wide band (UWB) communication module;
a plurality of antennas; and
a processor operatively connected to the UWB communication module,
wherein the UWB communication module is configured to:
receive first data of an UWB data frame from an external electronic device by using a first antenna set including at least two antennas among the plurality of antennas to measure a first angle of arrival (AOA);
receive second data of the UWB data frame by using a second antenna set including at least two antennas among the plurality of antennas to measure a second AOA, wherein the second antenna set is configured during a section of the UWB data frame that does not include data;
receive third data of the UWB data frame by using a third antenna set including at least two antennas among the plurality of antennas to measure a third AOA, wherein the third antenna set is configured during another section of the UWB data frame that does not include data;
measure a direction of the external electronic device by using the first AOA, the second AOA, and the third AOA;
measure a distance between the electronic device and the external electronic device based on at least some of signals received through the first to third antenna sets; and
discard the signal received by a common antenna when the distance between the electronic device and the external electronic device measured using a signal received by the common antenna belonging to the first through third antenna sets is out of a preset range.

2. The electronic device of claim 1, wherein when at least one of the plurality of antennas is not located on the same plane as other antennas, the UWB communication module is configured to measure an azimuth angle or an elevation angle of the external electronic device relative to the electronic device based on the first AOA, the second AOA, and the third AOA.

3. The electronic device of claim 1, wherein the UWB communication module is further configured to measure the distance between the electronic device and the external electronic device based on a signal having a highest magnitude among signals received through the first to third antenna sets.

4. The electronic device of claim 1, wherein when the plurality of antennas having received the first data, the second data, and the third data are located on the same plane, the first AOA, the second AOA, and the third AOA are each an AOA on a two-dimensional plane of the external electronic device relative to the electronic device.

5. The electronic device of claim 1, wherein the UWB communication module is further configured to determine a shortest distance to the external electronic device measured based on signals received by the first through third antenna sets as the distance between the electronic device and the external electronic device.

6. A method for an electronic device to perform positioning, the method comprising:
receiving first data of an UWB data frame from an external electronic device by using a first antenna set including at least two antennas among a plurality of antennas to measure a first angle of arrival (AOA);

receiving second data of the UWB data frame by using a second antenna set including at least two antennas among the plurality of antennas to measure a second AOA, wherein the second antenna set is configured during a section of the UWB data frame that does not include data;

receiving third data of the UWB data frame by using a third antenna set including at least two antennas among the plurality of antennas to measure a third AOA, wherein the third antenna set is configured during another section of the UWB data frame that does not include data;

measuring a direction of the external electronic device by using the first AOA, the second AOA, and the third AOA;

measuring a distance between the electronic device and the external electronic device based on at least some of signals received through the first to third antenna sets; and discarding a signal received by a common antenna when the distance between the electronic device and the external electronic device measured using the signal received by the common antenna belonging to the first through third antenna sets is out of a preset range.

7. The method of claim 6, further comprising:
measuring, when at least one of the plurality of antennas is not located on the same plane as other antennas, an azimuth angle or an elevation angle of the external electronic device relative to the electronic device based on the first AOA, the second AOA, and the third AOA.

8. The method of claim 6, wherein the distance between the electronic device and the external electronic device is measured based on a signal having a highest magnitude among signals received through the first to third antenna sets.

9. The method of claim 6, wherein when the plurality of antennas having received the first data, the second data, and the third data are located on the same plane, the first AOA, the second AOA, and the third AOA are each an AOA on a two-dimensional plane of the external electronic device relative to the electronic device.

10. The method of claim 6, wherein a shortest distance to the external electronic device measured based on signals received by the first through third antenna sets is determined as the distance between the electronic device and the external electronic device.

* * * * *